(12) United States Patent
Mikajiri et al.

(10) Patent No.: US 7,619,787 B2
(45) Date of Patent: Nov. 17, 2009

(54) METHOD AND APPARATUS FOR ILLUMINATING A DOCUMENT

(75) Inventors: Susumu Mikajiri, Tokyo (JP); Hideaki Matsui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 514 days.

(21) Appl. No.: 11/372,052

(22) Filed: Mar. 10, 2006

(65) Prior Publication Data
US 2006/0203495 A1 Sep. 14, 2006

(30) Foreign Application Priority Data

| Mar. 10, 2005 | (JP) | ................. 2005-067326 |
| Dec. 22, 2005 | (JP) | ................. 2005-370058 |
| Feb. 22, 2006 | (JP) | ................. 2006-045565 |

(51) Int. Cl.
*H04N 1/04* (2006.01)

(52) U.S. Cl. .................. 358/475; 358/483; 358/482; 358/497

(58) Field of Classification Search ................. 358/475, 358/483, 482, 497, 496, 487, 509, 505, 506, 358/512–514, 484; 250/208.1, 239, 216, 250/234–236; 399/220, 221, 206, 211, 212; 355/67, 68, 70, 71

See application file for complete search history.

(56) References Cited

U.S. PATENT DOCUMENTS 3,947,115 A 3/1976 Hamaguchi

| 4,682,042 A | * | 7/1987 | Igarashi ................. 250/208.1 |
| 2006/0092617 A1 | | 5/2006 | Mikajiri et al. |
| 2007/0019256 A1 | * | 1/2007 | Matsui et al. ............... 358/509 |

FOREIGN PATENT DOCUMENTS

| DE | 102 49 208 A1 | | 3/2004 |
| EP | 0 901 272 A2 | | 3/1999 |
| JP | 64058165 A | * | 1/1989 |
| JP | 64058165 A | * | 3/1989 |
| JP | 11-205538 | | 7/1999 |
| JP | 11-237699 | | 8/1999 |
| JP | 2000-307809 | | 11/2000 |
| JP | 2003-283820 | | 10/2003 |
| JP | 2004-235861 | | 8/2004 |

OTHER PUBLICATIONS

D. W. Baxter, et al., "Document Illuminator Using Elliptic and Dichroic Reflectors", IBM Technical Disclosure Bulletin, XP-002380616, vol. 14, No. 11, Apr. 1972, pp. 3236-3237.

* cited by examiner

*Primary Examiner*—Cheukfan Lee
(74) *Attorney, Agent, or Firm*—Oblon, Spivak, McClelland, Maier & Neustadt, P.C.

(57) ABSTRACT

An image forming apparatus includes at least one light source and at least one reflector. The at least one light source is configured to emit light and has an opening. The at least one reflector is configured to reflect the light emitted from the at least one light source. The opening is arranged at an obliquely downward portion of the at least one light source, the at least one reflector is disposed at a position obliquely downward of the at least one light source, and the light emitted from the opening of the at least one light source travels via the at least one reflector to illuminate a reading area of a document.

13 Claims, 7 Drawing Sheets

METHOD AND APPARATUS FOR ILLUMINATING A DOCUMENT

CROSS REFERENCE TO RELATED APPLICATIONS

The present application claims priority to Japanese patent application no. 2005-067326, filed in the Japan Patent Office on Mar. 10, 2005, Japanese patent application no. 2005-370058, filed in the Japan Patent Office on Dec. 22, 2005, and Japanese patent application no. 2006-045565, filed in the Japan Patent Office on Feb. 22, 2006, the disclosures of which are incorporated by reference herein in their entirety.

BACKGROUND OF THE INVENTION

1. Field of the Invention

Exemplary aspects of the present invention relate to a method and apparatus for illuminating a document. More particularly, exemplary aspects of the present invention relate to a document illuminating unit, using a fluorescent lamp serving as a light source, that efficiently illuminates an original document with a large quantity of light and a low amount of flare, an image scanner utilizing the document illuminating unit, and an image forming apparatus, such as a copier, printer, facsimile machine, and a multi-functional machine including the functions of the copier, printer, facsimile machine, and so forth. The image forming apparatus include the image scanner with the document illuminating unit.

2. Discussion of the Related Art

Related art image scanners included in an image forming apparatus generally employs a xenon lamp, having a diameter of approximately 10 mm, as a fluorescent lamp. The xenon lamp has a brightness smaller than a halogen lamp but has a greater amount of light emission because the xenon lamp has a greater area for emitting visible light rays. The xenon lamp also has higher luminous efficiency with respect to electric power consumption. Further, the amount of light emission of the xenon lamp is substantially proportional to an area covered with fluorescent coating. Therefore, the amount of light emission of the xenon lamp increases when a diameter of a glass tube of the xenon lamp is increased and fluorescent coating is applied to a wider area of the xenon lamp. However, a greater diameter of the glass tube requires a greater size of the document illuminating unit, and a greater size of an image scanner.

FIG. 1 shows a cross sectional view of a main portion of a related art xenon lamp 2 that has generally been used as a light source of a document illuminating unit. In FIG. 1, the xenon lamp 2 includes an opening or aperture 2a, a fluorescent material 2b, a lamp bulb or glass tube 2c, and electrodes 2d and 2e. The glass tube 2c has a transparent and cylindrical shape and a thickness of approximately 0.5 mm to approximately 1 mm. The electrodes 2d and 2e are disposed on a circumference of the glass tube 2c, facing each other. The xenon lamp 2 is filled with xenon gas and the electrodes 2d and 2e are applied with a predetermined amount (several hundred) of an alternating voltage so that light can be discharged from the xenon lamp 2. This discharge causes flows of electrons, which causes the electrons of xenon gas passing through the glass tube 2c to collide with the atoms of xenon gas in the glass tube 2c. This collision can generate ultraviolet rays. When the ultraviolet rays illuminate the fluorescent-coated inner circumference of the glass tube 2b, the fluorescent material is excited to emit visible light rays. The visible light rays are emitted from the aperture 2a to the outside the fluorescent lamp 2.

FIG. 2 shows a related art document illuminating unit utilizing the above-described xenon lamp as a light source to illuminate an original document. The related art document illuminating unit of FIG. 2 includes one xenon lamp and one reflection plate for illuminating its image reading area. A portion of luminous fluxes emitted from the xenon lamp travels through an opening or aperture (not shown) via the reflection plate to illuminate an original document placed on a contact glass. The other portion of luminous fluxes emitted from the xenon lamp directly illuminates the image reading area of the original document on the contact glass. After these luminous fluxes are reflected, the reflected luminous fluxes are directed to an image forming lens via first, second, and third mirrors (not shown) so that they can be ready as image data by an image reading unit, such as a CCD (charge-coupled device) sensor.

Related art reflection plates have a surface with an elliptic shape, a paraboloidal shape, and so forth. When a lamp serving as a light source has a columnar shape, a related art reflection plate corresponding to the lamp has a cylindrical shape.

Further, the reflection plate having a shape of an ellipse has two focal points, and a center of the fluorescent lamp is arranged at one of the two focal points, the focal point located at a far side of the original document.

The above-described related art document illuminating unit suffers from the disadvantage that a high-speed full-color image scanner that has high productivity requires a large amount of light to illuminate a document. To obtain a large quantity of light, however, the xenon lamp 2 needs a greater area coated by fluorescent agent, which requires a greater diameter of the glass tube 2c so as to flow a greater amount of electric current. If the diameter of the glass tube 2c becomes greater in size, the area of the aperture 2a also becomes greater. This causes the reflection plate itself to have a greater size, which contributes to maximization of the document illuminating unit.

Further, since the xenon lamp 2 has a relatively large area of light emission and has the aperture 2a to emit luminous flux, it is difficult to collect the luminous flux to illuminate a document area. For example, as shown in FIG. 2, the luminous flux emitted for illuminating a document area A may illuminate as far as an area B. That is, the luminous flux illuminates a wider area than expected. Therefore, reflecting light rays of unnecessary luminous flux travel via a reflection plate and the xenon lamp 2 to illuminate the original document. Thus, the original document is illuminated again. When the reflecting light rays have has a large quantity of light, an amount of light emission may change according to a density of the original document. The density of an original document is substantially equal to an area coverage rate of the original document, which shows how much image data covers a reading area on the original document. For example, when an original document has a low area coverage, the density of the original document becomes lower. When an original document has a high area coverage, the density of the original document becomes higher. The related art document illuminating unit has a disadvantage that a density value of scanned image data becomes different from a density value of data of an original document, and the reproducibility of image may become worse. Further, the reproducibility of image also becomes worse even when the related art document illuminating unit having a lamp generally with a large quantity of light is used.

SUMMARY OF THE INVENTION

Exemplary aspects of the present invention have been made in view of the above-described circumstances.

Exemplary aspects of the present invention is to provide a document illuminating unit that can efficiently illuminates an original document with a large quantity of light and a low amount of flare by reducing unnecessary luminous flux and downsizes a reflection plate used in the document illuminating unit.

Exemplary aspects of the present invention provide a method of illuminating a document with light emitted from a light source via a reflection plate.

In one exemplary embodiment, a document illuminating unit includes at least one light source and at least one reflector. The at least one light source is configured to emit light and has an opening. The at least one reflector is configured to reflect the light emitted from the at least one light source. The opening is arranged at an obliquely downward portion of the at least one light source. The at least one reflector is disposed at a position obliquely downward of the at least one light source. The light emitted from the opening of the at least one light source travels via the at least one reflector to illuminate a document reading area.

The at least one light source may include a fluorescent lamp. The at least one reflector may have a shape of an ellipse to collect the light emitted from the at least one light source.

One focal point of the reflector may be arranged in a straight line of a center of the fluorescent lamp and a center of the opening. Another focal point may be arranged in a vicinity of a reading position of a document.

The reflector may be expressed by following formulas;

$$(X^2/A^2)+(Y^2/B^2)=1, \text{ and}$$

$$(A>B>0),$$

and may also be expressed by the following formulas;

$$\alpha > \sin^{-1}(R/D), \text{ and}$$

$$\theta = \alpha + \beta + \gamma,$$

where "X" represents a major axis of the ellipse, "Y" represents a minor axis of the ellipse, "θ" represents a lean angle of the ellipse with respect to an optical axis in a direction of a plumb line to an document, "α" represents an angle between the major axis of the ellipse and a nearest light ray to the document, "β" represents a light convergent angle, "γ" represents an angle between a farthest light ray from the document and the optical axis in the direction of the plumb line to the document, "R" represents a radius of the fluorescent lamp, and "D" represents a distance between two focal points.

The reflector may be expressed by following formulas;

$$(X^2/A^2)+(Y^2/B^2)=1, \text{ and}$$

$$(A>B>>0),$$

and may also be expressed by the following formulas;

$$Y = (D \cdot \sin 2\theta)/2,$$

where "X" represents a major axis of the ellipse, "Y" represents a minor axis of the ellipse, "D" represents a distance between two focal points, and "θ" represents a lean angle of the ellipse with respect to an optical axis in a direction of a plumb line to an document.

The at least one light source may include two fluorescent lamps configured to emit light respectively. The at least one reflector may include two reflectors configured to reflect the light emitted from the respective fluorescent lamps. Each of the reflectors has a shape of an ellipse. Further, a cross point of major axes of the respective ellipses of the reflectors may be located at one of a first position inside a contact glass and a second position outside the contact glass.

The cross point of the major axes of the respective ellipses of the reflectors may be a focal point of the ellipses of the reflectors located on the document, and the following formula may be satisfied;

$$D \cdot \cos \theta = H,$$

where "D" represents a distance between the two focal points, "θ" represents a lean angle of the ellipse with respect to an optical axis in a direction of a plumb line to a document, and "H" represents a distance from a center of each of the fluorescent lamps to a lower surface of the contact glass.

The at least one light source may include one fluorescent lamp configured to emit light. The at least one reflector may include one reflector having a shape of an ellipse and configured to reflect the light emitted from the one fluorescent lamp. A focal point of the ellipse of the reflector may be located at one of a first position inside a contact glass and a second position outside the contact glass.

The at least one light source may include two fluorescent lamps configured to emit light respectively. The at least one reflector may include two reflectors configured to reflect the light emitted from the respective fluorescent lamps. Each of the reflectors may have a shape of an ellipse. The reflector may be expressed by following formulas;

$$(X^2/A^2)+(Y^2/B^2)=1, \text{ and}$$

$$(A>B>0),$$

and may also be expressed by the following formulas;

$$\alpha > \sin^{-1}(R/D), \text{ and}$$

$$\theta = \alpha + \beta + \gamma,$$

where "X" represents a major axis of the ellipse, "Y" represents a minor axis of the ellipse, "θ" represents a lean angle of the ellipse with respect to an optical axis in a direction of a plumb line to an document, "α" represents an angle between the major axis of the ellipse and a nearest light ray to the document, "β" represents a light convergent angle, "γ" represents an angle between a farthest light ray from the document and the optical axis in the direction of the plumb line to the document, "R" represents a radius of the fluorescent lamp, and "D" represents a distance between two focal points. One focal point of the reflector may be arranged in a straight line of a center of the fluorescent lamp and a center of the opening. Another focal point may be arranged in a vicinity of a reading position of the document. A cross point of major axes of the respective ellipses of the reflectors may be located at one of a first position inside a contact glass and a second position upper than the contact glass.

The above-described novel document illuminating unit may be included in a document reading device.

The above-described novel document illuminating unit may be included in an image forming apparatus.

Further, in one exemplary embodiment, a novel method of illuminating a document with light emitted from a light source via a reflector includes emitting light from the light source to the reflector arranged at an obliquely downward position with respect to the light source, receiving the emitted light, and reflecting the emitted light to the document.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS

Figure 1:
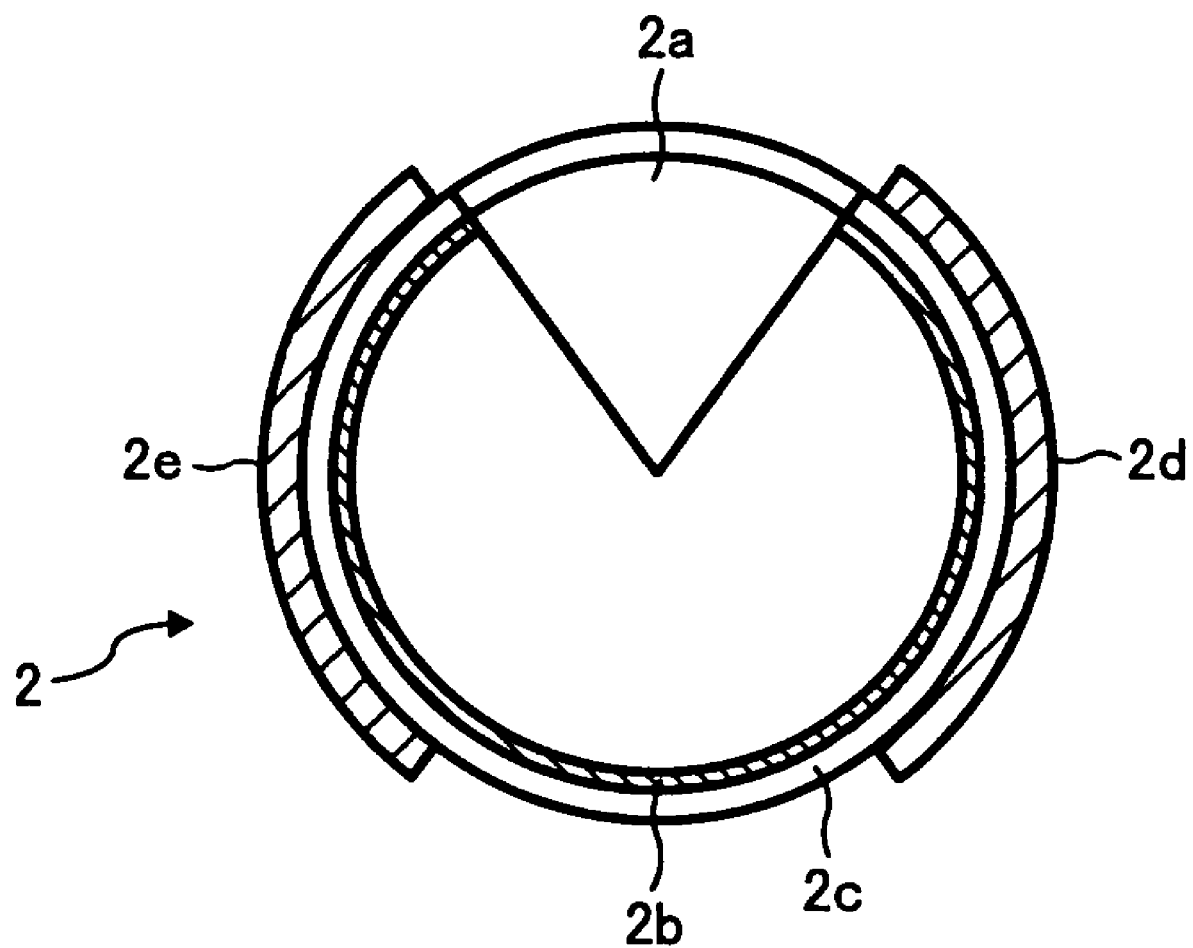
FIG. 1 is a cross sectional view of a main portion of a xenon lamp generally used as a light source.
Figure 2:
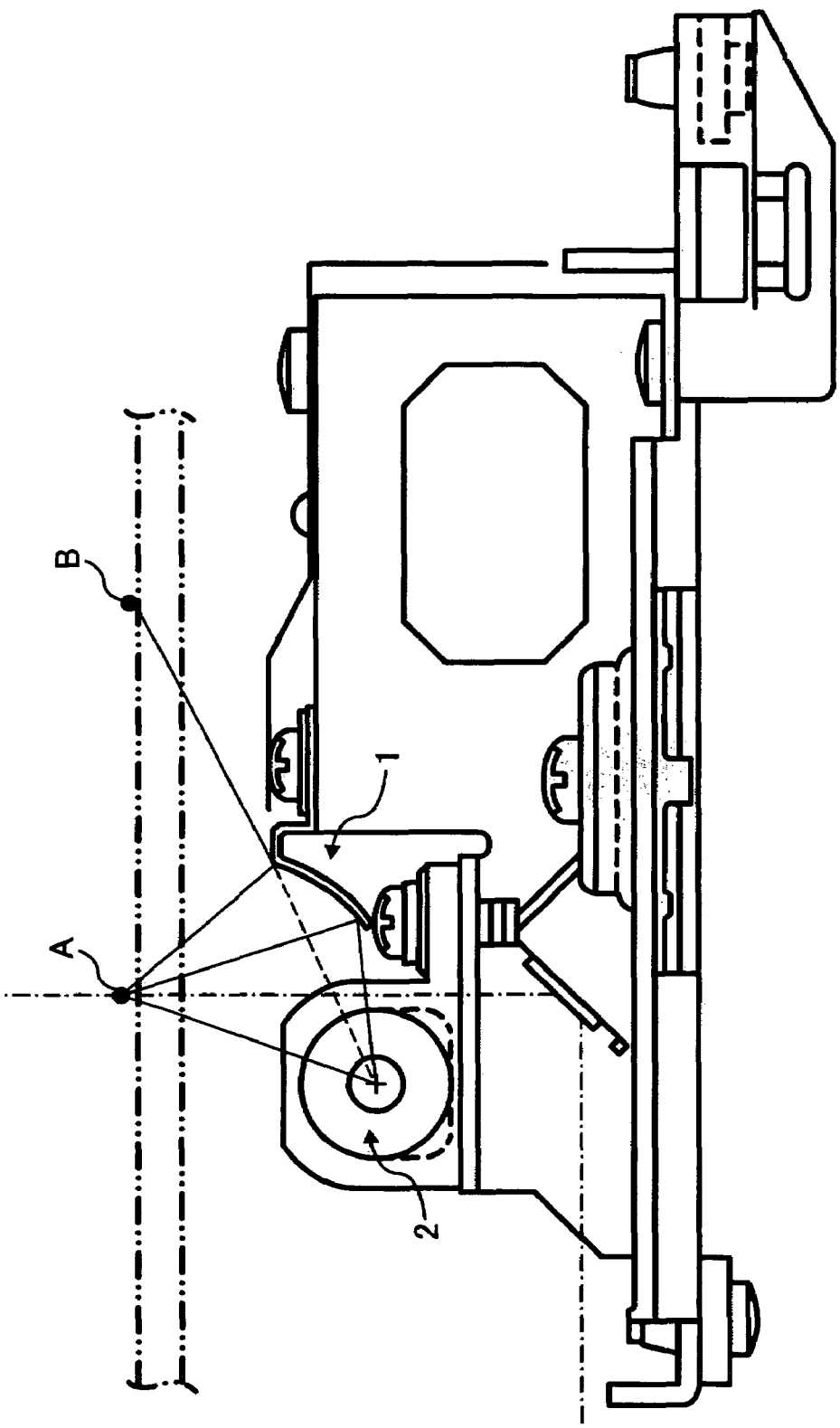
FIG. 2 is a cross sectional view of a related art document illuminating unit utilizing the xenon lamp of FIG. 1.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, exemplary embodiments of the present invention are described.

Figure 3:
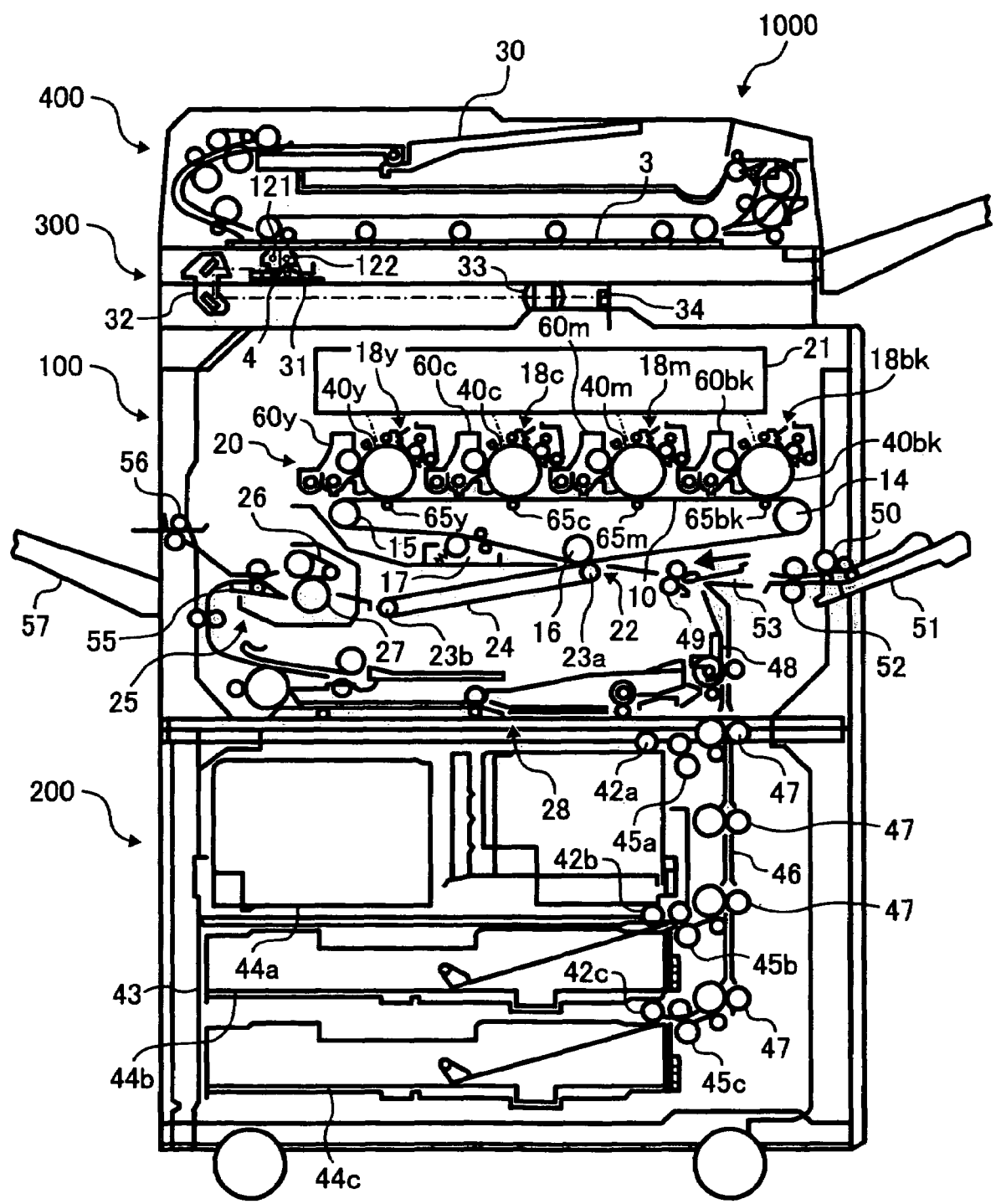
FIG. 3 is a schematic structure of an image forming apparatus including an image scanner having a document illuminating unit according to an exemplary embodiment of the present invention.

Referring to FIG. 3, a structure of a image forming apparatus 1000 including an image scanner 300 having a document illuminating unit 31 according to an exemplary embodiment of the present invention is now described.

The image forming apparatus 1000 of FIG. 3 includes a main body 100, a sheet feeding table 200, an image scanner 300, and an automatic document feeder (ADF) 400.

The main body 100 is disposed on the sheet feeding table 200. The image scanner 300 serves as an image reading device and is provided on the upper surface of the main body 100. The automatic document feeder 400 is provided on the top of the image scanner 300.

In FIG. 3, the main body 100 can include four image forming units 18y, 18c, 18m, and 18bk as a tandem-type image forming mechanism 20, an intermediate transfer member 10 as a transfer mechanism, a writing unit 21 as a writing mechanism, a fixing unit 25 as a fixing mechanism, and a portion of a sheet feeding mechanism that is mainly disposed in the sheet feeding table 200.

The four image forming units 18y, 18c, 18m, and 18bk of the tandem-type image forming mechanism 20 include four photoconductive elements 40y, 40c, 40m, and 40bk, respectively. The four photoconductive elements 40y, 40c, 40m, and 40bk can have similar structures and functions, except that the toners are different colors to form yellow images, magenta images, cyan images, and black images, respectively.

The four image forming units 18y, 18c, 18m, and 18bk are separately arranged at positions having horizontal heights or elevations forming the tandem-type image forming mechanism 20. The photoconductive elements 40y, 40c, 40m, and 40bk separately receive respective light laser beams emitted by the writing unit 21, such that electrostatic latent images are formed on the respective surfaces of the four photoconductive elements 40y, 40c, 40m, and 40bk.

Respective charging rollers (not shown) are held in contact with the photoconductive elements 40y, 40c, 40m, and 40bk to charge respective surfaces of the photoconductive elements 40y, 40c, 40m, and 40bk.

Respective developing units 60y, 60c, 60m, and 60bk are separately disposed in a vicinity of or adjacent to the four image forming units. 18y, 18c, 18m, and 18bk, respectively. The respective developing units 60y, 60c, 60m, and 60bk store the different colored toners for the image forming units 18y, 18c, 18m, and 18bk.

The writing unit 21 is provided at a position above the tandem-type image forming mechanism 20. The writing unit 21 is provided at a position above the image forming units 18y, 18c, 18m, and 18bk. The writing unit 21 has four laser diodes (LDs), a polygon scanner, and lenses and mirrors. The four laser diodes (LDs) serve as light sources and irradiate the respective photoconductive elements 40m, 40c, 40y and 40bk with respective imagewise laser light beams to form electrostatic latent images thereon. The polygon scanner including a polygon mirror having plural surfaces and a polygon motor. Lenses such as f-theta lenses, elongate WTLs, and other lenses, and mirrors are provided in an optical path of the respective laser light beams. The laser light beams emitted from the laser diodes are deflected by the polygon scanner to irradiate the photoconductive elements 40m 40c, 40y and 40bk.

The transfer mechanism, which includes the intermediate transfer belt 10, is located or disposed below the tandem-type image forming mechanism 20 (substantially at the center of the image forming apparatus 1000). The intermediate transfer member 10 forms an endless belt and is passed over or surrounds a plurality of supporting rollers 14, 15, and 16. The intermediate transfer member 10 is held in contact with the photoconductive elements 40y, 40c, 40m, and 40bk, and is driven to rotate clockwise, as indicated by an arrow as shown in FIG. 3.

In FIG. 3, an intermediate transfer member cleaning unit 17 is provided in the left side of the supporting roller 15. The intermediate transfer member cleaning unit 17 removes a residual toner on the intermediate transfer member 10 after image formation.

Four primary transfer unit 65y, 65c, 65m, and 65bk are disposed inside a loop of the intermediate transfer member 10 to face the respective photoconductive elements 40y, 40c, 40m, and 40bk, which are accommodated in the image forming units 18y, 18c, 18m, and 18bk.

A secondary transfer unit 22 is located on the opposite side of the intermediate transfer member 10 from the tandem type image forming mechanism 20. The secondary transfer unit 22 includes a secondary transfer belt 24 that is an endless belt, and the transfer belt 24 is extended between two secondary transfer rollers 23a and 23b. The secondary transfer unit 22 is arranged such that a portion of the secondary transfer belt 24, which is close to the secondary transfer roller 23a, presses the intermediate transfer member 10 against the supporting roller 16. When a recording sheet is conveyed to a portion between the supporting roller 16 and the secondary transfer roller 23a of the secondary transfer belt 24, an overlaid color toner image formed on the surface of the intermediate transfer member 10 is transferred onto the recording sheet.

The fixing unit 25 is positioned at a lower left side of the main body 100, in a vicinity of the secondary transfer roller 23b and below the supporting roller 15. The fixing unit 25 includes a fixing belt 26 and a pressure roller 27, and is configured to press the pressure roller 27 against the fixing belt 26 that is an endless belt The secondary transfer unit 22 also serves as a sheet transport mechanism for transporting a recording sheet having a color toner image thereon to the fixing unit 25. As an alternative to the secondary transfer unit 22, a transfer roller or a non-contact transfer charging unit may be used. In a case in which the transfer roller or the non-contact transfer charging unit is used, however, a sheet transport mechanism may be separately provided for transporting a recording sheet having a color toner image thereon to the fixing unit 25.

In the image forming apparatus 1000 of FIG. 3, the main body 100 is further provided with a sheet reverse unit 28 for reversing a recording sheet on one side of which an image is formed. Another image can be formed on the other side of the recording sheet for a duplex image forming operation in a duplex copy mode. The sheet reverse unit 28 is arranged under the secondary transfer unit 22 and the fixing unit 25, and is substantially parallel to the tandem-type image forming mechanism 20.

While the main body 100 includes several components, such as a sheet transporting passage 48 and a pair of registration rollers 49 serving as the sheet feeding mechanism, which will be described below, the sheet feeding mechanism is mainly arranged in the sheet feeding table 200.

The sheet feeding table 200, serving as the sheet feeding mechanism, is arranged in a lower portion of the image forming apparatus 1000, and includes: sheet feeding rollers 42a, 42b, and 42c; a sheet bank 43; sheet feeding cassettes 44a, 44b, and 44c; sheet separation rollers 45a, 45b, and 45c; a sheet transporting passage 46; and a plurality of sheet feeding rollers 47.

The sheet feeding cassettes 44a, 44b and 44c are provided to the sheet bank 43 and are loaded with a stack of sheets of particular size, including a recording sheet (not shown). When an image forming operation is performed, the recording sheet is fed from one of the sheet feeding cassettes 44a, 44b, and 44c and is conveyed toward the pair of registration rollers 49.

The sheet feeding mechanism also includes a manual sheet feeding tray 51, a switch pawl 55, a pair of sheet discharging rollers 56, and a sheet discharging tray 57.

The manual sheet feeding tray 51 is mounted on the right side of the main body 100 of FIG. 3, and includes sheet inlet rollers 50, sheet separation rollers 52 and a manual sheet transporting passage 53. After opening the manual sheet feeding tray 51, an operator of the image forming apparatus 1000 may feed sheets by hand.

The image scanner 300 includes an original document stacker 30 and a contact glass 3.

The image scanner 300 also includes first and second moving units 31 and 32, an image forming lens 33, and an image reading sensor 34.

Now, a full color image forming operation of the above-described image forming apparatus 1000 is described.

Before starting an image forming operation, a set of original documents are placed in a face-up orientation on the original document stacker 30 of the ADF 400. Alternatively, the set of original documents can manually be placed sheet by sheet directly on the contact glass 3 of the image scanner 300. When each original document is directly placed on the contact glass 3, an operator lifts up the ADF 400 having a shell-like openable structure. After the original document is correctly placed, the operator lowers the ADF 400 to a closing position. Thereby an entire surface of the original document placed on the contact glass 3 may be pressed by a lower surface of the ADF 400.

When a start button (not shown) is pressed, an uppermost sheet of the set of original documents placed on the ADF 400 is separated and is transported to the contact glass 3 of the image scanner 300 and, subsequently, the image scanner 300 is activated. That is, the first and second moving units 31 and 32 of the image scanner 300 slide in a predetermined direction. When the original document is manually set on the contact glass 3, the image scanner 300 is immediately activated upon the press of the start button.

The first moving unit 31 is a document lighting unit 31, and includes light sources 121 and 122, reflection plates 111 and 112 (see FIG. 4), and a first mirror 4. The second moving unit 32 includes second and third mirrors (not shown).

The first moving unit or the document lighting unit 31 causes a light beam to emit and deflects the light beam reflected by the original document placed on the contact glass 3. The second moving unit 32 receives the light beam reflected by the mirror or the first moving unit 31 and reflects the light beam to the image reading sensor 34 via the image forming lens 33.

When the start button is pressed, one of the supporting rollers 14, 15, and 16 is driven by a drive motor (not shown) to rotate the other two rollers. This causes the intermediate transfer member 10 to rotate. Subsequently, the image forming units 18y, 18c, 18m, and 18bk are driven to rotate the corresponding photoconductive elements 40y, 40c, 40m, and 40bk. This forms single color images in yellow, cyan, magenta, and black on the respective photoconductive elements 40y, 40c, 40m, and 40bk in the image forming mechanism 20.

When the image forming apparatus 1000 receives full color image data, each of the photoconductive elements 40y, 40c, 40m, and 40bk rotates in a counterclockwise direction in FIG. 3 and are uniformly charged with corresponding charging rollers (not shown) included in respective charging units (not shown). The writing unit 21 emits the light beams corresponding to the respective color image data and irradiates the photoconductive elements 40y, 40c, 40m, and 40bk of the image forming units 18y, 18c, 18m, and 18bk, respectively. Electrostatic latent images corresponding to the respective color image data are formed on respective surfaces of the photoconductive elements 40y, 40c, 40m, and 40bk. The electrostatic latent images formed on the respective photoconductive elements 40y, 40c, 40m, and 40bk are visualized by the respective developing units 60y, 60c, 60m, and 60bk, which contain respective color toners therein, into yellow, cyan, magenta, and black toner images, respectively. Those color toner images are sequentially overlaid on the surface of the intermediate transfer member 10 such that a composite color image is formed on the surface of the intermediate transfer member 10.

When the start button is pressed, the original document is scanned and a size of a copy sheet is determined. In a case in which a size of the copy sheet selected is equivalent to the recording sheet accommodated in the sheet feeding cassette 44a, the sheet feeding roller 42a starts to rotate so that the recording sheet is conveyed to the sheet separation roller 45a in the sheet feeding cassette 44a. The sheet separation roller 45a separates the recording sheet from the following sheets and transfers the recording sheet to the sheet transporting passage 46. The recording sheet S is conveyed by the plurality of sheet feeding rollers 47 through the sheet transporting passage 48 to the pair of registration rollers 49.

When manual insertion is used, the sheet inlet roller 50 is rotated to feed a set of recording sheets placed on the manual sheet feeding tray 51 to the pair of sheet separation rollers 52. Then, the pair of sheet separation rollers 52 separate an uppermost recording sheet from the set of recording sheets placed on the manual sheet feeding tray 51 and transfers the uppermost recording sheet, which will be referred to as the recording sheet, to the pair of registration rollers 49 through the manual sheet transporting passage 53.

Then, the pair of registration rollers 49 stops and feeds the recording sheet in synchronization with a movement of the composite color image towards a transfer area formed between the intermediate transfer member 10 and the secondary transfer unit 22. In particular, the transfer area is formed between a portion where the intermediate transfer member 10 is supported by the supporting roller 16 and a portion where the secondary transfer unit 22 is supported by the secondary transfer roller 23a. The composite color image formed on the surface of the intermediate transfer member 10 is transferred onto the recording sheet at the transfer area.

The recording sheet that has the composite color image thereon is further conveyed and passes through the fixing unit 25. The fixing unit 25 fixes the composite color image to the recording sheet by applying heat and pressure.

As an alternative, the recording sheet may be sent to the sheet reverse unit 28 when the switch pawl 55 selects a sheet transporting passage (not shown) for the duplex image forming operation. When the duplex image forming operation is performed, the sheet reverse unit 28 receives the recording sheet, which on one side an image is formed. Another recording sheet is fed to the sheet reverse unit 28 after the recording sheet is switched back to the face-down orientation at the sheet transporting passage of the sheet reverse unit 28. The sheet reverse unit 28 then transports the recording sheet via the sheet transporting passage 48 to the pair of registration rollers 49 to pass through the transfer area formed between the intermediate transfer member 10 and the secondary image transfer unit 22 so that a next composite color image is transferred onto the back surface of the recording sheet. Then, the recording sheet, having composite color images printed on the front and back sides, is conveyed to the fixing unit 25.

After the recording sheet passes through the fixing unit 25, the recording sheet passes through a discharging passage selected by the switch pawl 55 and is discharged to a sheet discharging tray 57 via a pair of sheet discharging rollers 56.

After the composite color image is transferred onto the recording sheet, the intermediate transfer member cleaning unit 17 removes residual toner on the surface of the intermediate transfer member 10 before a next image forming operation.

Next, the image forming operation for producing black and white copies is described.

When the image forming apparatus 1000 receives a command to produce black and white copies according to black and white image data, the supporting roller 15 is moved downward, thereby separating the image transfer belt 10 from the photoconductive elements 40*y*, 40*c* and 40*m*. The photoconductive element 40*bk* of the image forming unit 18*bk* rotates in the counterclockwise direction in FIG. 3 to be uniformly charged with the corresponding charging roller (not shown). Then an imagewise laser light beam corresponding to the black and white image data irradiates the photoconductive element 40*bk*, resulting in formation of an electrostatic latent image on the photoconductive element 40*bk*. The electrostatic latent image formed on a surface of the photoconductive element 40*bk* is developed with the black developing device 60*bk*, resulting in formation of a black toner image on the photoconductive element 40*bk*. In this case, the image forming units 18*y*, 18*c* and 18*m*, the photoconductive elements 40*y*, 40*c*, and 40*bk*, and the developing units 60*y*, 60*c* and 60*m* are not activated. Therefore, undesired abrasion of the photoconductive elements 40*m*, 40*c* and 40*y* and undesired consumption of the toners other than the black toner can be reduced or prevented.

The recording sheet is fed from one of the sheet feeding cassettes 44a, 44b, and 44c, to the image forming unit 18*bk* in synchronization with the pair of registration rollers 49 such that the black toner image formed on the photoconductive element 40*bk* is transferred to a proper position of the recording sheet.

Since the recording sheet is fed while the recording paper is attracted by the image transfer belt 10, the recording sheet can be fed to the photoconductive element 40*bk* even when the photoconductive elements 40*m*, 40*c* and 40*y* are separated from the image transfer belt 10, resulting in formation of the black color image on the recording sheet.

After the black toner image is fixed by the fixing unit 25, the recording sheet having the black toner image on the surface is discharged. When a request producing two or more copies is specified, the image forming operation described above is repeated.

The image forming apparatus 1000 including the image scanner 300 has the structures and functions and performs the operations as described above. However, the structures, functions, and operations of the image forming apparatus 1000 of an exemplary embodiment of the present invention are not limited to those described above. For example, the image forming apparatus 1000 according to an exemplary embodiment of the present invention can include one image bearing member for a plurality of developing units with an intermediate transferring system. The image forming apparatus according to on exemplary embodiment of the present invention also can be an image forming apparatus that performs black and white image forming but not color image forming.

Now, the following are document illuminating unit 31 according to the exemplary embodiments of present invention.

First Exemplary Embodiment

Figure 4:
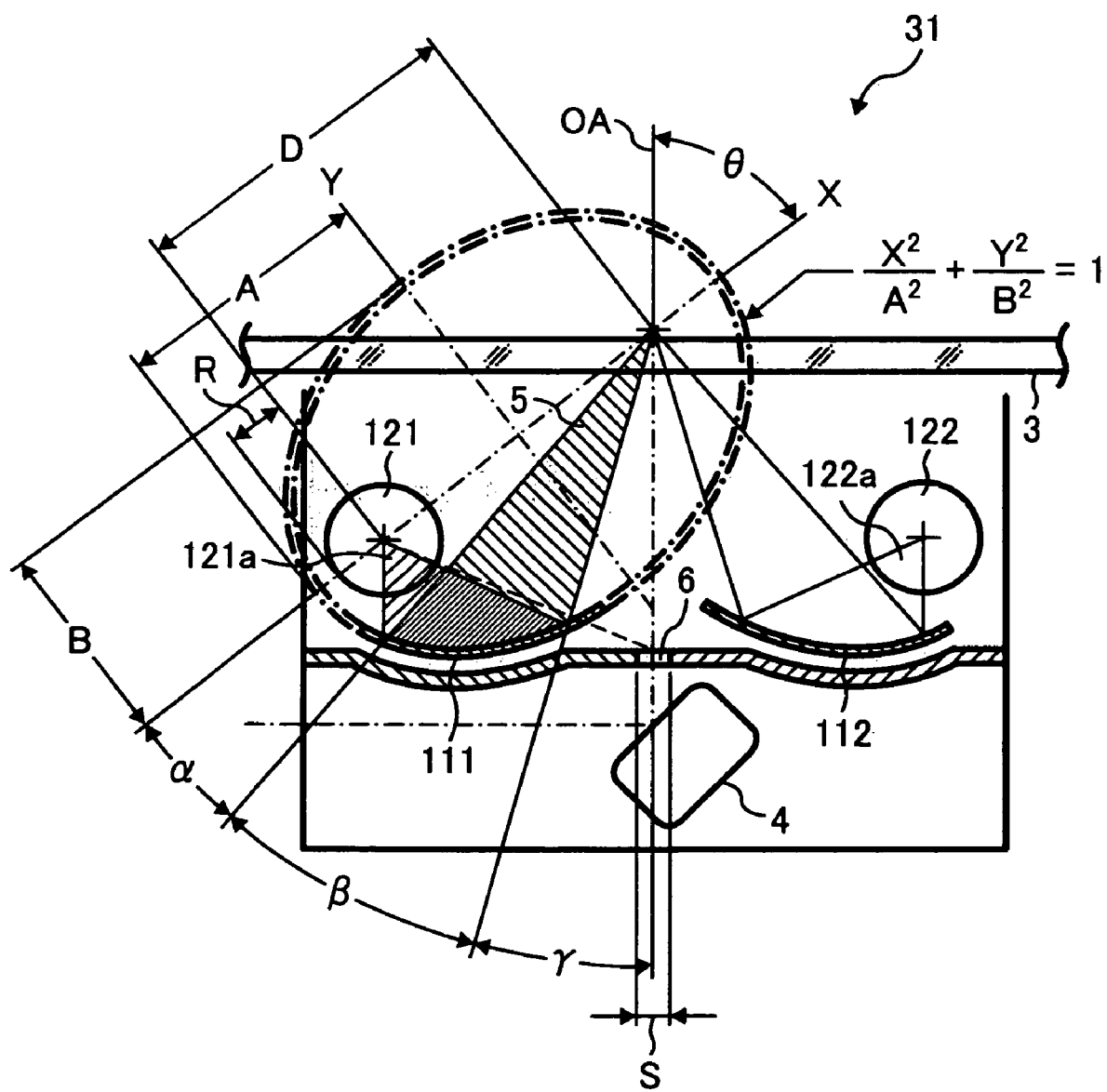
FIG. 4 is a side view showing a schematic structure of an exemplary embodiment of the document illuminating unit according to the present invention.

Referring to FIG. 4, a schematic structure of the document illuminating unit 31 is described.

FIG. 4 is a cross sectional view of the document illuminating unit 31 according to an exemplary embodiment of the present invention. The document illuminating unit 31 includes two fluorescent lamps 121 and 122, first and second reflection plates 111 and 112.

The two fluorescent lamps 121 and 122 serving as a light source can be a xenon lamp, having a cylindrical shape in its major axis. The fluorescent lamps 121 and 122 have respective openings or apertures 121a and 122a. The apertures 121a and 122a are arranged at an obliquely downward portion of the fluorescent lamps 121 and 122, respectively.

The first and second reflection plates 111 and 112 have a shape of an ellipse. The first reflection plate 111 is disposed at a position obliquely downward the fluorescent lamp 121. The second reflection plate 112 is disposed at a position obliquely downward the fluorescent lamp 122.

When the fluorescent lamps 121 and 122 emit respective luminous fluxes or light rays from the respective apertures 121a and 122a, the first reflection plates 111 corresponding to the fluorescent lamp 121 and the second reflection plate 112 corresponding to the fluorescent lamp 122 collect the respective luminous fluxes to illuminate a document reading area of the contact glass 3 on which an original document is placed.

Further, in the document illuminating unit 31, one focal point of an ellipse of the reflection plate 111 is arranged in a straight line of the center of the fluorescent lamp 121 and the center of the aperture 121a and another focal point is arranged in a vicinity of a reading position of an original document. One focal point of an ellipse of the reflection plate 112 is arranged on a straight line extending from the center of the fluorescent lamp 122 to the center of the aperture 122a and another focal point is arranged in a vicinity of a reading position of an original document.

The structure of the document illuminating unit 31 shown in FIG. 4 has the two fluorescent lamps 121 and 122 and the two reflection plates 111 and 112. However, as an alternative, one fluorescent lamp and one reflection plate can be applied to the document illuminating unit 31 of an exemplary embodiment of the present invention.

Now, the following describe shapes of the reflection plates 111 and 112, and a positional relationship of the fluorescent lamps 121 and 122. The reflection plates 111 and 112 and the fluorescent lamps 121 and 122 shown in FIG. 4 are symmetrically disposed, sandwiching an optical axis OA in a direction of a plumb line from the reflection mirror 4 to an original document. Since the reflection plates 111 and 112 have similar structures and functions to each other and the fluorescent lamps 121 and 122 also have similar structures and functions to each other, the reflection plate 111 and the fluorescent lamp 121 are described below.

As previously described, the reflection plate 111 has the shape of an ellipse. When a major axis of the ellipse of the reflection plate 111 is represented as a coordinate "X" and a minor axis of the ellipse of the reflection plate 111 is represented as a coordinate "Y", the shape of the ellipse is expressed by the following formulas;

$$(X^2/A^2)+(Y^2/B^2)=1, \text{ and}$$

$$(A>B>0),$$

where the major axis of the ellipse (a coordinate "X") is inclined by an angle "θ (theta)" with respect to the optical axis OA in the direction of the plumb line from the reflection mirror 4 to the original document.

A center of the fluorescent lamp 121 having a radius "R" is arranged at one of two focal points of the ellipse. The focal point is located at a far side of the original document. Another focal point is arranged to be located in the vicinity of a reading position of the original document.

A solid line drawn on the circumference mainly drawn by an alternate short and long dashed line in FIG. 4 represents the reflection plate 111.

In this exemplary embodiment, "α", "β", and "γ" are defined as follows:

α: an angle between the major axis of the ellipse and a nearest light ray to the original document;
β: a light convergent angle; and
γ: an angle between a farthest light ray from the original document and the optical axis OA in the direction of the plumb line from the reflection mirror 4 to the original document. The three angles "α", "β", and "γ" separately reside, and the angle "θ" that is a lean angle of the ellipse with respect to the optical axis OA in the direction of the plumb line from the reflection mirror 4 to the original document satisfies the formula:

$$\theta = \alpha + \beta + \gamma.$$

Further, the angle "α" satisfies the formula:

$$\alpha > \sin^{-1}(R/D),$$

where "D" represents a distance between the two focal points, and "R" represents the radius of the fluorescent lamp 121.

The aperture 121a of the fluorescent lamp 121 is arranged at an obliquely downward portion on a circumference of the fluorescent lamp 121 and is configured to output light therethrough. The light emitting angle of the aperture 121a is arranged and directed to face the opposite side to the original document and also to face the optical axis OA in the plumb line from the reflection mirror 4 to the original document. With the above-described arrangement, an amount of unnecessary light for illuminating the original document can be reduced. Further, when the angle "α" is determined in accordance with the above-described formula, the luminous flux reflected at the reflection plate 111 is not limited by the fluorescent lamp 121 itself, so that the light can efficiently be used to illuminate the original document.

The structure and formulas described above for the reflection plate 111 and the fluorescent lamp 121 can also be applied to the reflection plate 112 and the fluorescent lamp 122.

Second Exemplary Embodiment

Figure 5:
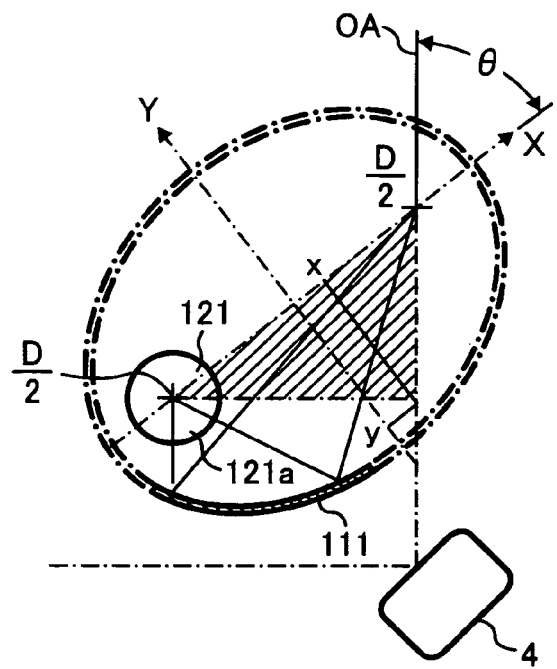
FIG. 5 is a side view of an ellipse of a reflector and a fluorescent lamp of FIG. 4.

Referring to FIG. 5, a side view of the ellipse of the reflection plate 111 and the fluorescent lamp 121 of FIG. 4 is described.

In FIG. 5, a right triangle which is bounded by a line between the two focal points of the ellipse, the optical axis OA in the direction of the plumb line from the reflection mirror 4 to the original document, and a horizontal line extending from the center of the fluorescent lamp 121 and running perpendicular to the optical axis OA in the direction of the plumb line is discussed.

When the major axis of the ellipse is represented as a coordinate "X" and the minor axis of the ellipse is represented as a coordinate "Y", the shape of the ellipse of the reflection plate 111 is, as previously described, expressed by the following formulas;

$$(X^2/A^2)+(Y^2/B^2)=1, \text{ and}$$

$$(A>B>0), \text{ and}$$

a value "y" of an apex of the right triangle in the coordinate "Y" is expressed by the following formula;

$$y = D \cdot \sin\theta \cdot \cos\theta$$
$$= (D \cdot \sin 2\theta)/2,$$

where "D" is a distance between the two focal points and the angle "θ" is the lean of the ellipse with respect to the optical axis OA in the direction of the plumb line from the reflection mirror 4 to the original document.

If the ellipse of the reflection plate 111 passes through a point that resides outside the coordinate "Y" and the focal points are arranged on the center of the fluorescent lamp 121 and the original document, an appropriate ellipse shape fitting in a relatively small space can be determined.

Further, if the relation among the three factors, such as "α", "β", and "γ", and the value "y" which restricts a size of the ellipse satisfy the formulas, it is possible to determine an appropriate positional relationship between the fluorescent lamp 121 and the reflection plate 111 and a shape of the reflection plate 111. With the above-described structure, it is possible to efficiently illuminate the original document and reduce the incidence of flare.

A shaded area 5 shown in FIG. 4 shows a range of light rays or luminous fluxes that is used to effectively illuminate the original document. Since the aperture 121a of the fluorescent lamp 121 is facing the opposite side to the original document, light passing through a slit 6 and shining directly on the reflection mirror 4 can be ambient light to adversely affect the reproducibility of image of the original document. However, the reflection plate 111 has a shape extending for a sufficient length to a direction of the optical axis OA in the direction of the plumb line to the original document from the reflection mirror 4 to reduce the negative effect due to ambient light. That is, the reflection plates 111 and 112 have a shape to function to avoid the direct incident light from the fluorescent lamps 112 and 122, respectively, on the reflection mirror 4. Moreover, the size of the reflection plate 111 is determined so as not to cover a distance S of the slit 6.

Third Exemplary Embodiment

Figure 6:
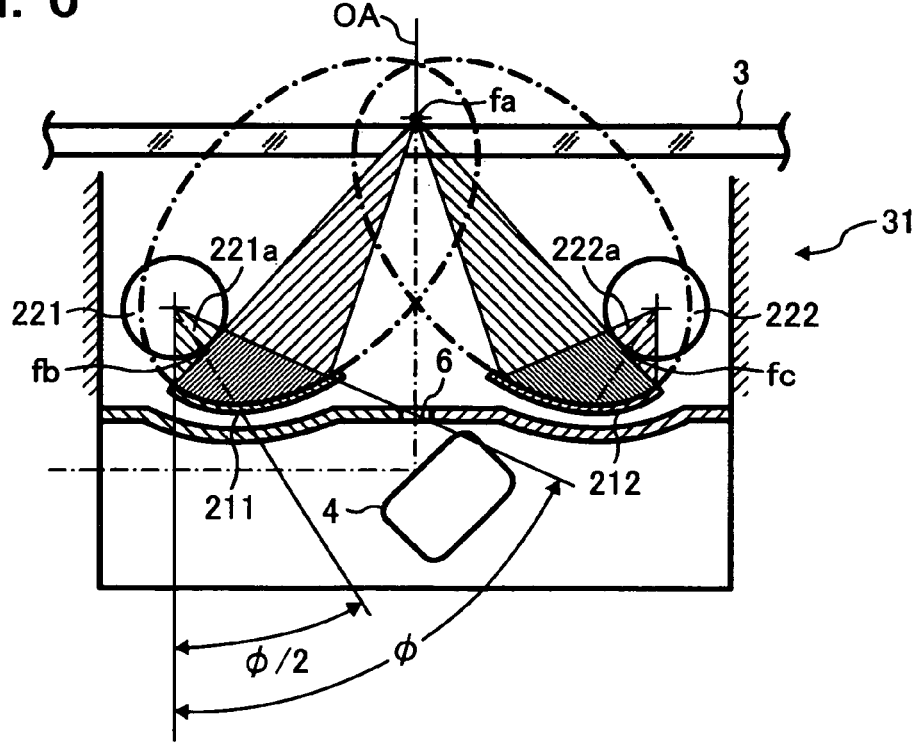
FIG. 6 is a side view of another exemplary embodiment of the document illuminating unit according to the present invention.

Referring to FIG. 6, a side view of another exemplary embodiment of the document illuminating unit 31 is described. The document illuminating device of FIG. 6 includes two reflection plates 211 and 212 having respective shapes of an ellipse while the document illuminating device of FIG. 4 is described for one fluorescent lamp.

In FIG. 6, one focal point "fa" is arranged at a position on the optical axis OA in the direction of the plumb line to the original document and in the vicinity of the original document to be illuminated. Another focal point is located at a cross point "fb" of a fluorescent lamp 221 on a straight line extending from the center of the fluorescent lamp 221 to the center of an opening or aperture 221a on the circumference of a tube of the fluorescent lamp 221 with an angle "φ/2". Another focal point is located at a cross point "fc" of a fluorescent lamp 222 on a straight line extending from the center of the fluorescent lamp 222 to the center of an opening or aperture 222a on the circumference of a tube of the fluorescent lamp 222.

Fourth Exemplary Embodiment

Figure 7:
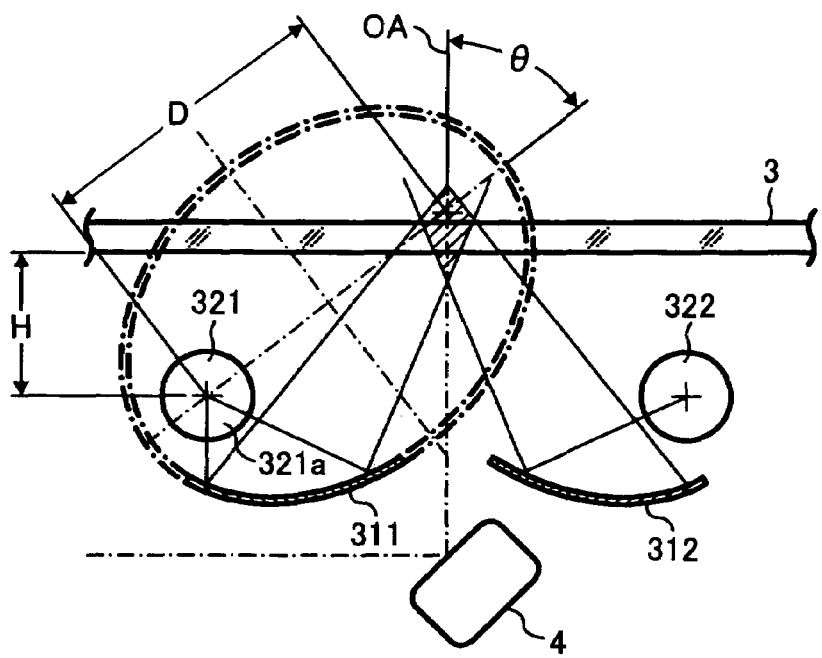
FIG. 7 is a side view showing another exemplary embodiment of the document illuminating unit according to the present invention.

Referring to FIG. 7, a side view showing another document illuminating unit 31 according to an exemplary embodiment of the present invention.

In FIG. 7, the document illuminating unit 31 includes two fluorescent lamps 321 and 322 and two reflection plates 311 and 312 that respectively correspond to the fluorescent lamps 321 and 322. Each of the reflection plates 311 and 312 has a shape of an ellipse. The structures and functions of the fluorescent lamps 321 and 322 are identical to each other, and the structures and functions of the reflection plates 311 and 312 are also identical to each other. While the fluorescent lamp 321 has an opening or aperture 321a in FIG. 7, the fluorescent lamp 322 also has an opening or aperture that is not shown in FIG. 7.

When a distance "H" is from the center of each of the two fluorescent lamps 321 and 322 to a lower surface of the contact glass 3, if the distance "H" is expressed by the following formula;

$$D \cdot \cos \theta = H,$$

the document illuminating unit 31 of this exemplary embodiment may use a distance "D" between two focal points and an angle "θ" of the ellipse with respect to the optical axis OA in the direction of the plumb line from the reflection mirror 4 to the original document so that the above-described formula is satisfied. With the above-described structure as shown in FIG. 7, it is possible that an apex of the area on which the light rays emitted from the fluorescent lamps 321 and 322 are traveling across each other (a shaded area in FIG. 7) is arranged at an upper portion than the original document placed on the contact glass 3 so that the brightest area can be used for illuminating the original document.

Now the fluorescent lamps 321 and 322 used in FIG. 7 are a xenon lamp that illuminates an area, and therefore, the light rays illuminating the original document are not converged to a focal point.

Figure 8:
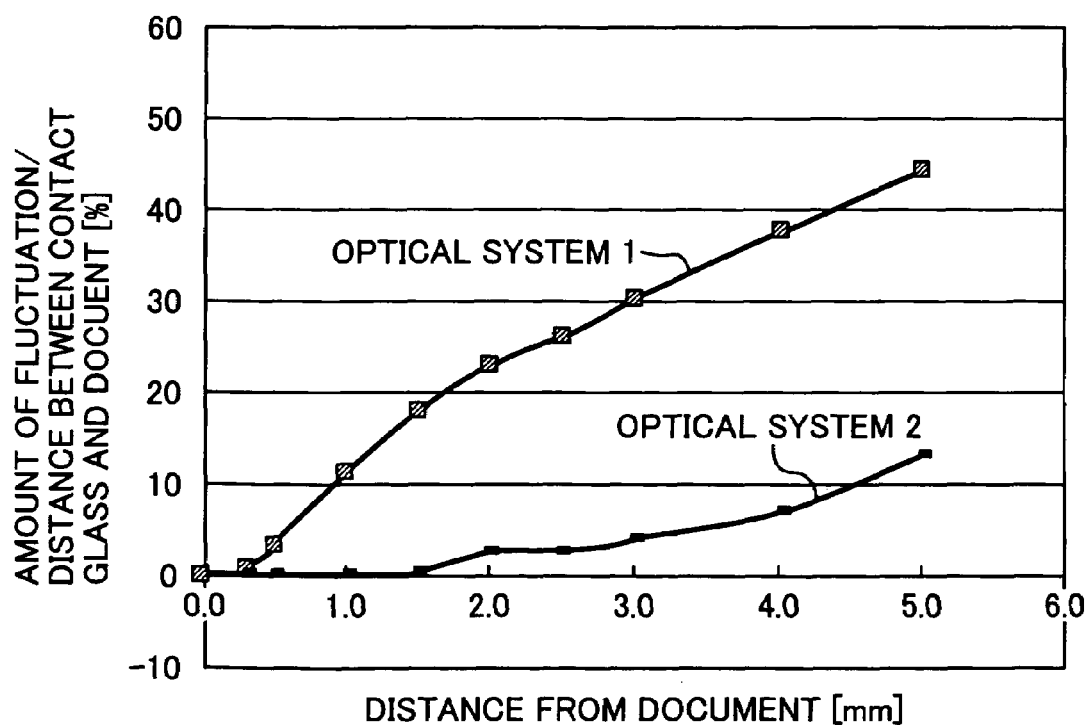
FIG. 8 is a graph showing distances from a surface of the original document to an upper surface of a contact glass included in an image scanner and amounts of fluctuation of image data.

Referring to FIG. 8, a graph shows distances from a surface of the original document to an upper surface of the contact glass 3 included in the image scanner 300 of FIG. 3 and the amounts of fluctuation of image data.

As shown in FIG. 8, "optical system 1" shows the amount of fluctuation of image data read by a related art optical system, and "optical system 2" shows the amount of fluctuation of image data read by a proposed optical system according to an exemplary embodiment of the present invention. As shown in FIG. 8, when the document illuminating unit 31 according to an exemplary embodiment of the present invention has at least one of the fluorescent lamps 121 and 122 and at least one of the reflection plates 111 and 112 corresponding to the fluorescent lamps 121 and 122, respectively, the document illuminating unit 31 can reduce the amount of fluctuation of image data having a distance between the contact glass 3 and the original document to ⅓ or less of the amount of fluctuation of image data for a related art document illuminating unit.

As described above, the document illuminating unit 31 according to an exemplary embodiment of the present invention includes the fluorescent lamps 121 and 122, each of which has a cylindrical shape in its major axis, and have the apertures 121a and 122a arranged at an obliquely downward portion of the fluorescent lamps 121 and 122, respectively. The document illuminating unit 31 also includes the first and second reflection plates 111 and 112 having a shape of an ellipse. The reflection plate 111 is disposed at a position obliquely downward the fluorescent lamp 121, and the second reflection plate 112 is disposed at a position obliquely downward the fluorescent lamp 122. When the fluorescent lamps 121 and 122 emit respective luminous fluxes from the respective apertures 121a and 122a, the first reflection plates 111 corresponding to the fluorescent lamp 121 and the second reflection plate 112 corresponding to the fluorescent lamp 122 collect the respective luminous fluxes to illuminate a document reading area of the contact glass 3 on which an original document is placed. With the above-described structure, light passing directly from the fluorescent lamps 121 and 122 and shining directly on the reflection mirror 4 is reduced or prevented. Thereby, the document illuminating unit 31 is not adversely affected by a reflection density of the original document, and can reduce the amount of unnecessary light for illuminating the original document and efficiently illuminate the original document.

Further, as previously described, the ellipse of each of the reflection plates 111 and 112 is expressed by the following formulas;

$$(X^2/A^2)+(Y^2/B^2)=1, \text{ and}$$

$$(A>B>0),$$

and is also expressed by the following formulas;

$$\alpha > \sin^{-1}(R/D), \text{ and}$$

$$\theta = \alpha + \beta + \gamma,$$

where "X" represents a major axis of the ellipse, "Y" represents a minor axis of the ellipse, "θ" represents a lean angle of the ellipse with respect to an optical axis OA in the direction of a plumb line from the reflection mirror 4 to the original document, "α" represents an angle between the major axis of the ellipse and a nearest light ray to the original document, "β" represents a light convergent angle, "γ" represents an angle between a farthest light ray from the original document and the optical axis OA in the direction of the plumb line from the reflection mirror 4 to the original document, "R" represents a radius of the fluorescent lamps 121 and 122, and "D" represents a distance between two focal points. One focal point is arranged to a center of the fluorescent lamps 121 or 122 having the radius R, and another focal point is arranged to be located in the vicinity of the reading position of the original document. With the above-described structure, the light emitting angle of each of the apertures 121a and 122a is arranged and directed to face the opposite side to the original document and also to face the optical axis OA in the plumb line from the reflection mirror 4 to the original document. Thus, it is possible to reduce the incident of flare and efficiently illuminate the original document.

Further, as previously described in reference to FIGS. 4 and 5, the ellipse of each of the reflection plates 111 and 112 is expressed by the following formulas;

$$(X^2/A^2)+(Y^2/B^2)=1, \text{ and}$$

$$(A>B>0), \text{ and}$$

$$Y=(D \cdot \sin 2\theta)/2,$$

where "X" represents the major axis of the ellipse, "Y" represents the minor axis of the ellipse, "D" represents the distance between the two focal points, and "θ" represents the lean angle of the ellipse with respect to the optical axis OA in the direction of the plumb line from the reflection mirror 4 to the original document. One focal point is arranged to the center of the fluorescent lamps 121 or 122 having the radius R, and another focal point is arranged to be located in the vicinity of the reading position of the original document. With the above-described structure, it is possible to determine an appropriate positional relationship between the fluorescent lamps 121 and 122 and the reflection plates 111 and 112, and a shape of the reflection plates 111 and 112. Further, it is possible to determine the optimal conditions of the ellipse of the reflection plates 111 and 112 according to the distance "D" between the two focal points and the angle "θ" of the ellipse with respect to the optical axis OA in the direction of the plumb line from the reflection mirror 4 to the original document.

Figure 9:
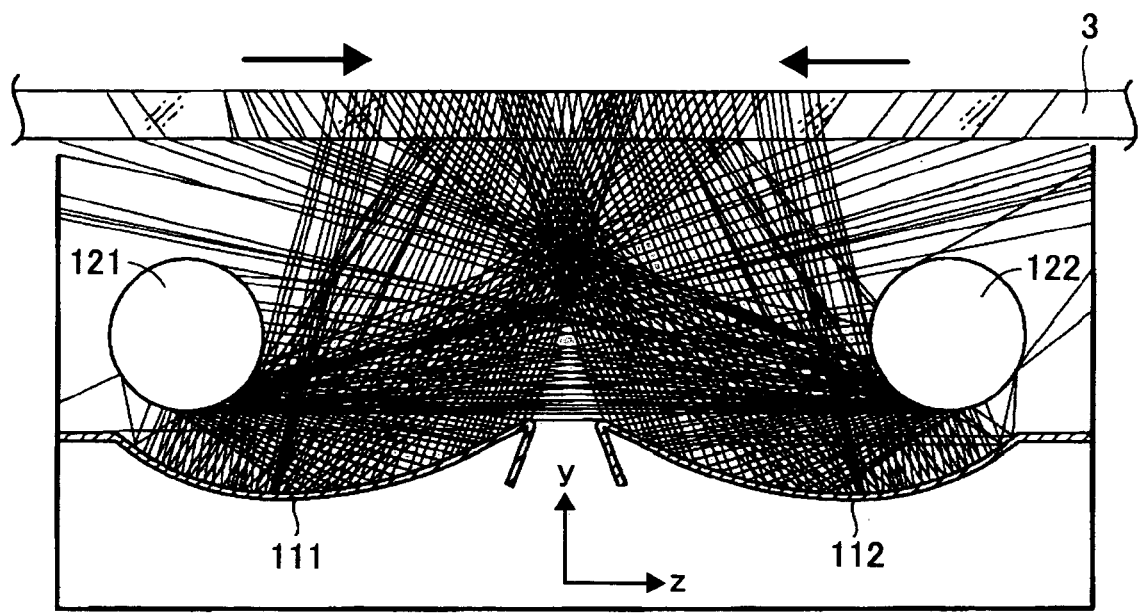
FIG. 9 is a schematic view showing estimated beam lines of light of the document illuminating unit of FIG. 4.
Figure 10:
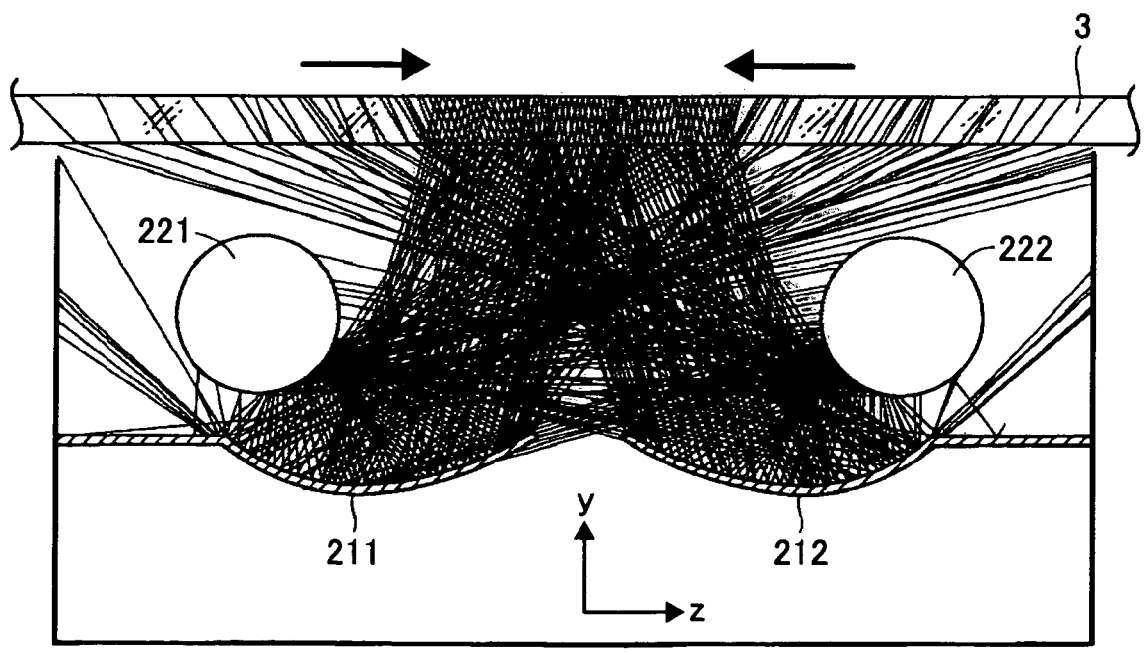
FIG. 10 is a schematic view showing estimated beam lines of light of the document illuminating unit of FIG. 6.

Now, referring to FIGS. 9 and 10, schematic views show estimated beam lines of light of the document illuminating apparatus 31 of FIGS. 4 and 6, respectively. In FIG. 9, one focal point of the ellipse of each of the reflection plates 111 and 112 is located at the center of each of the fluorescent lamps 121 (corresponding to the reflection plate 111) and 122 (corresponding to the reflection plate 112) and another focal point is located on the original document to be illuminated. In FIG. 10, one focal point of the reflection plate 211 is located at a cross point "fb" of the fluorescent lamp 221 on a straight line extending from the center of the fluorescent lamp 221 to the center of the aperture 221a on the circumference of a tube of the fluorescent lamp 221 with an angle "φ/2". Also, one focal point is located at a cross point "fc" of the fluorescent lamp 222 on a straight line extending from the center of the fluorescent lamp 222 to the center of the aperture 222a on the circumference of a tube of the fluorescent lamp 222. Another focal point "fa" is arranged on the original document to be illuminated on the optical axis OA in the direction of the plumb line to the original document.

Now, coordinates "x" and "y" in FIGS. 9 and 10 are used for simulations to obtain the estimated beam lines of light of the document illuminating apparatus 31. The coordinate "x" indicates a direction of a plumb line of light traveling in the document illuminating unit 31, and the coordinate "y" indicates a direction of a horizontal line of the light.

When FIGS. 9 and 10 are compared, the light rays or luminous fluxes emitted from the fluorescent lamps 221 and 222 of the document illuminating unit 31 of FIG. 10 are more collected at the reading position of the original document than the light rays or luminous flux emitted from the fluorescent lamps 121 and 122 of the document illuminating unit 31 of FIG. 9. Further, the areas of the ellipses of the reflecting plates 211 and 212 of FIG. 10 can be arranged smaller so as to fit in a relatively small space in a downsized document illuminating unit 31.

Further, the reflection plates 111 and 112 and the fluorescent lamps 121 and 122 in FIG. 9 and the reflection plates 211 and 212 and the fluorescent lamps 221 and 222 in FIG. 10 are symmetrically disposed, both sandwiching the optical axis OA in the direction of the plumb line from the reflection mirror 4 to the original document. The above-described structure can cause the document illuminating unit 31 to uniformly emit the reading area of the original document from the fluorescent lamps 121, 122, 212, and 222. Thereby, it is possible to avoid shading problems caused by curling of the original document when the original document is relatively small.

In addition to the above-described structures, a cross point of the major axes of the respective ellipses of the reflection plates 111 and 112 is located at a position inside or upper outside than the contact glass 3. As previously shown in FIG. 7, the cross point of the major axes of the respective ellipses of the reflection plates 111 and 112 is a focal point of the ellipses of the reflection plates 111 and 112 located on the original document, and is expressed by the following formula;

$$D \cdot \cos \theta = H,$$

where "D" represents a distance between the two focal points, "θ" represents a lean angle of the ellipse with respect to the optical axis OA in the direction of the plumb line from the reflection mirror 4 to the original document, and "H" represents a distance from the center of each of the fluorescent lamps 121 and 122 to a lower surface of the contact glass 3. With the above-described structure, it is possible that the apex of the area on which the light rays emitted from the fluorescent lamps 121 and 122 are traveling across each other is arranged at an upper portion than the original document placed on the upper surface of the contact glass 3 so that the brightest area can be used for illuminating the original document. That is, as shown in FIG. 8, the original document having a distance above 0 mm from the contact glass 3 can be illuminated at the brightness substantially equal to the original document closely placed on the upper surface the contact glass 3. Thus, the fluctuation of light rays or luminous fluxes can be reduced and the density or the area coverage rate of an original document can have less difference from the density or the area coverage rate of the image data obtained from the original document.

The above-described structure and function are described for the document illuminating unit 31 having the two fluorescent lamps 121 and 122 and the two reflection plates 111 and 112. However, the above-described structure and function of an exemplary embodiment of the present invention can also be applied to the document illuminating unit 31 having one fluorescent lamp and one reflection plate.

Further, the document illuminating unit 31 of an exemplary embodiment of the present invention can simultaneously satisfy the structures and functions as described above. Since the apertures 121a and 122a of the fluorescent lamps 121 and 122 in this exemplary embodiment are facing the opposite side of the original document, the incident of flare can be reduced, and therefore, an appropriate ellipse shape to forming the light rays emitted from the fluorescent lamps 121 and 122 to the convergent luminous fluxes.

Further, the document illuminating unit 31 of an exemplary embodiment of the present invention can arrange the reflection plates 111 and 112 to have a shape that can avoid the direct incident light from the fluorescent lamps 112 and 122, respectively, on the reflection mirror 4. Thus, the document illuminating unit 31 can reduce the amount of unnecessary light for illuminating the original document and efficiently illuminate the original document.

The above-described exemplary embodiments are illustrative, and numerous additional modifications and variations are possible in light of the above teachings. For example, elements and/or features of different illustrative and exemplary embodiments herein may be combined with each other and/or substituted for each other within the scope of this disclosure. It is therefore to be understood that the disclosure of this patent specification may be practiced otherwise than as specifically described herein.

What is claimed:

1. A document illuminating unit comprising:
   at least one light source configured to emit light, the at least one light source including a fluorescent lamp and having an opening arranged at an obliquely downward portion of the at least one light source; and
   at least one reflector configured to reflect the light emitted from the at least one light source, and the at least one reflector is disposed at a position obliquely downward of the at least one light source, the light emitted from the opening of the at least one light source travels via the at least one reflector to illuminate a reading area of a document, and the at least one reflector has a shape of an ellipse to collect the light emitted from the at least one light source, wherein:
   the reflector is expressed by following formulas;

$(X^2/A^2)+(Y^2/B^2)=1$, and $(A>B>0)$, and is also expressed by the following formulas;

$\alpha > \sin^{-1}(R/D)$, and $\theta = \alpha + \beta + \gamma$, where "X" represents a major axis of the ellipse, "Y" represents a minor axis of the ellipse, "θ" represents a lean angle of the ellipse with respect to an optical axis in a direction of a plumb line to an document, "α" represents an angle between the major axis of the ellipse and a nearest light ray to the document, "β" represents a light convergent angle, "γ" represents an angle between a farthest light ray from the document and the optical axis in the direction of the plumb line to the document, "R" represents a radius of the fluorescent lamp, and "D" represents a distance between two focal points, and
   one focal point of the reflector is arranged in a straight line of a center of the fluorescent lamp and a center of the opening and another focal point is arranged in a vicinity of a reading position of the document.

2. The document illuminating unit according to claim 1, wherein:
   the at least one light source comprises two fluorescent lamps configured to emit light respectively, and the at least one reflector comprises two reflectors, each having a shape of an ellipse, the two reflectors configured to reflect the light emitted from the respective fluorescent lamps, and
   a cross point of major axes of the respective ellipses of the reflectors is located at one of a first position inside a contact glass and a second position outside the contact glass.

3. The document illuminating unit according to claim 1, wherein:
   the at least one light source comprises one fluorescent lamp configured to emit light, and the at least one reflector comprises one reflector having a shape of an ellipse and configured to reflect the light emitted from the one fluorescent lamp, and
   a focal point of the ellipse of the reflector is located at one of a first position inside a contact glass and a second position outside the contact glass.

4. The document illuminating unit according to claim 1, wherein:
   the document illuminating unit is included in a document reading device.

5. The document illuminating unit according to claim 1, wherein:
   the document illuminating unit is included in an image forming apparatus.

6. A document illuminating unit comprising:
   at least one light source configured to emit light, the at least one light source including a fluorescent lamp and having an opening arranged at an obliquely downward portion of the at least one light source; and
   at least one reflector configured to reflect the light emitted from the at least one light source, and the at least one reflector is disposed at a position obliquely downward of the at least one light source, the light emitted from the opening of the at least one light source travels via the at least one reflector to illuminate a reading area of a document, and the at least one reflector has a shape of an ellipse to collect the light emitted from the at least one light source, wherein:
   the reflector is expressed by following formulas;

$(X^2/A^2)+(Y^2/B^2)=1$, and $(A>B>0)$, and is also expressed by the following formulas;

$$Y=(D\cdot\sin 2\theta)/2,$$

where "X" represents a major axis of the ellipse, "Y" represents a minor axis of the ellipse, "D" represents a distance between two focal points, and "θ" represents a lean angle of the ellipse with respect to an optical axis in a direction of a plumb line to an document, and one focal point of the reflector is arranged in a straight line of a center of the fluorescent lamp and a center of the opening and another focal point is arranged in a vicinity of a reading position of the document.

7. The document illuminating unit according to claim 6, wherein:

the at least one light source comprises two fluorescent lamps configured to emit light respectively, and the at least one reflector comprises two reflectors, each having a shape of an ellipse, the two reflectors configured to reflect the light emitted from the respective fluorescent lamps, and a cross point of major axes of the respective ellipses of the reflectors is located at one of a first position inside a contact glass and a second position outside the contact glass.

8. The document illuminating unit according to claim 6, wherein:

the at least one light source comprises one fluorescent lamp configured to emit light, and the at least one reflector comprises one reflector having a shape of an ellipse and configured to reflect the light emitted from the one fluorescent lamp, and a focal point of the ellipse of the reflector is located at one of a first position inside a contact glass and a second position outside the contact glass.

9. The document illuminating unit according to claim 6, wherein:

the document illuminating unit is included in a document reading device.

10. The document illuminating unit according to claim 6, wherein:

the document illuminating unit is included in an image forming apparatus.

11. A document illuminating unit comprising:

at least one light source configured to emit light, the at least one light source including a fluorescent lamp and having an opening arranged at an obliquely downward portion of the at least one light source; and at least one reflector configured to reflect the light emitted from the at least one light source, and the at least one reflector is disposed at a position obliquely downward of the at least one light source, the light emitted from the opening of the at least one light source travels via the at least one reflector to illuminate a reading area of a document, and the at least one reflector has a shape of an ellipse to collect the light emitted from the at least one light source, wherein:

the at least one light source comprises two fluorescent lamps configured to emit light respectively, and the at least one reflector comprises two reflectors, each having a shape of an ellipse, the two reflectors configured to reflect the light emitted from the respective fluorescent lamps, and the reflector is expressed by following formulas;

$$(X^2/A^2)+(Y^2/B^2)=1, \text{ and}$$

$$(A>B>0),$$

and is also expressed by the following formulas;

$$\alpha > \sin^{-1}(R/D), \text{ and}$$

$$\theta=\alpha+\beta+\gamma,$$

where "X" represents a major axis of the ellipse, "Y" represents a minor axis of the ellipse, "θ" represents a lean angle of the ellipse with respect to an optical axis in a direction of a plumb line to an document, "α" represents an angle between the major axis of the ellipse and a nearest light ray to the document, "β" represents a light convergent angle, "γ" represents an angle between a farthest light ray from the document and the optical axis in the direction of the plumb line to the document, "R" represents a radius of the fluorescent lamp, and "D" represents a distance between two focal points, and one focal point of the reflector is arranged in a straight line of a center of the fluorescent lamp and a center of the opening and another focal point is arranged in a vicinity of a reading position of the document, and a cross point of major axes of the respective ellipses of the reflectors is located at one of a first position inside a contact glass and a second position outside the contact glass.

12. The document illuminating unit according to claim 11, wherein:

the document illuminating unit is included in a document reading device.

13. The document illuminating unit according to claim 11, wherein:

the document illuminating unit is included in an image forming apparatus.

* * * * *